June 17, 1969
D. L. ROSS
3,451,009
LUMINESCENT MATERIAL AND LASER APPARATUS
UTILIZING SAID MATERIAL
Filed March 4, 1966
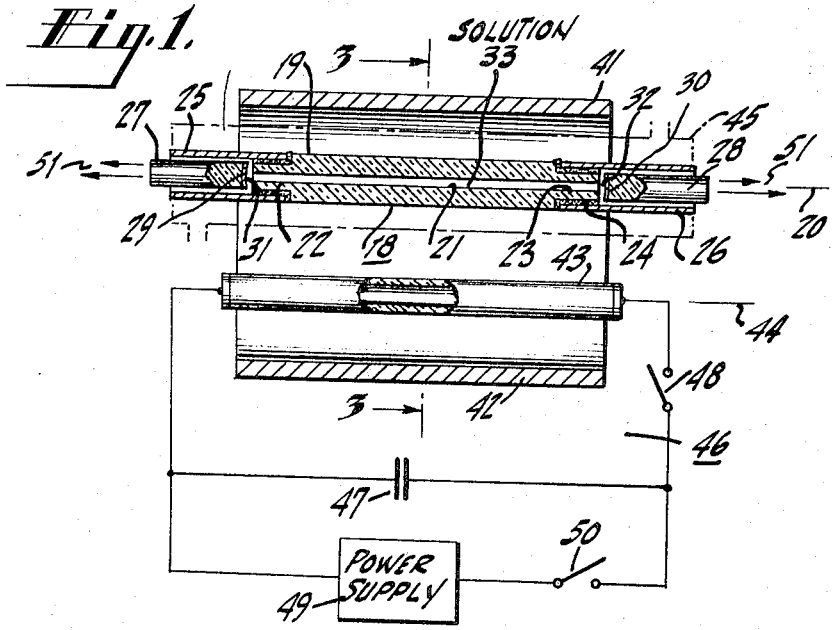
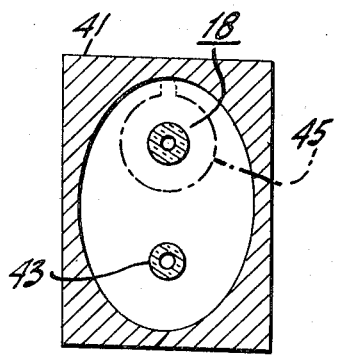
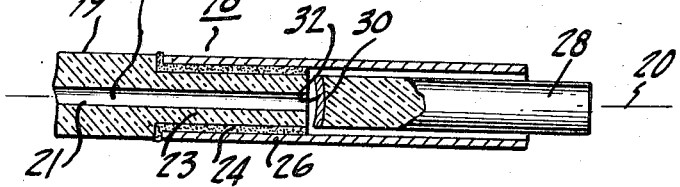
INVENTOR.
Daniel L. Ross
BY
Attorney

United States Patent Office 3,451,009
Patented June 17, 1969

3,451,009
LUMINESCENT MATERIAL AND LASER APPARATUS UTILIZING SAID MATERIAL
Daniel L. Ross, Princeton, N.J., assignor to Radio Corporation of America, a corporation of Delaware
Filed Mar. 4, 1966, Ser. No. 531,915
Int. Cl. H01s 3/04, 3/20; C09k 1/00
U.S. Cl. 331—94.5                    16 Claims This invention relates to a new composition of matter and to an improved laser apparatus.

Most present day liquid and solid lasers comprise, in general, luminescent cations in a solid or liquid medium. To produce coherent radiation from these cations, they are pumped with noncoherent radiant energy. This energy causes a population inversion of an excited metastable state relative to a terminal state of the cations. These excited cations are then stimulated to decay from the metastable state to the terminal state whereby coherent radiation is emitted. The radiation thus emitted is characteristic of the cation. The solid or liquid medium functions principally as a passive host for the luminescent cations. The minimum input energy to the pumping means which is required to initiate lasing is here defined as the threshold energy. It is obviously desirable to reduce this threshold energy. Such reduction may be achieved, for example through improvements in the efficiency of the pump means or by changes in the laser material which reduces the energy required for producing coherent emission.

One previous laser material comprises a liquid in which there is dissolved a chelate of a luminescent cation; for example, trivalent europium. Generally, chelate laser materials have an advantage over other classes of laser materials, because the organic portion of the molecule absorbs energy in a broader band and transfers this energy to the luminescent cation. In the case of europium chelate lasers, this broader pump band reduces the energy required from the pump means to initiate the lasing of the luminescent cation. However, still lower threshold energies are desirable, thereby reducing the energy requirements on the pumping means. Such reduction of pump energy is advantageous also in that it reduces the overall power requirements of the laser apparatus and also reduces unwanted heating of the laser liquid.

An object of this invention is to provide a novel luminescent chelate capable of lasing at a lower threshold energy than previous chelate lasers.

A further object is to provide an improved laser apparatus embodying the novel chelate.

In general, the novel luminescent materials are octacoordinate chelate compounds represented by the formula $d_\alpha\text{-}Ad_\lambda\text{-}L_4Eu$ (III). In this formula L represents a 4,4,4-trifluoro-1-aryl-1,3-butanediono ligand, wherein the aryl radical is either an unsubstituted phenyl group, a phenyl group substituted in the meta or para-position, or a thienyl group; Eu (III) is trivalent europium; and A represents an organic ammonium ion. The $d_\alpha$ and $d_\lambda$ represent a number $\alpha$ and $\lambda$ of deuterium atoms "d" which have been substituted for hydrogen atoms normally present in the chelate on the A or the L part of the molecule, respectively.

The novel materials are characterized in that a substantial proportion of the hydrogen atoms in the chelate compound are replaced by deuterium atoms. This replacement is sometimes referred to as "deuteration." Deuteration of the above class of compounds unexpectedly results in a significant reduction in the threshold energy over corresponding undeuterated compounds when solutions of these novel compounds are used to produce coherent emission. It has further been found that the temperature dependence of the threshold energy is reduced with solutions of these novel chelates as compared to their undeuterated analogs.

The improved apparatus for producing coherent radiation by stimulated emission comprises a resonant cavity including a body containing a solution of at least one of the novel chelates disclosed herein, means for exciting the chelate above its laser threshold, and means for deriving the coherent radiation from the cavity. The solution contains a proportion of one of the novel chelates disclosed herein, preferably in the range of about $5\times10^{-3}$ to $2\times10^{-2}$ molar. The solution is essentially transparent and nonscattering to the coherent radiation produced. The solvent can be any liquid which is capable of dissolving the chelate in the required molar proportions without substantially dissociating it and which will give an essentially transparent and nonscattering solution at the wavelength of the coherent radiation.

The invention will be understood more clearly and fully from the following detailed description with reference to the accompanying drawing in which:

FIGURE 1 is a partially schematic, partially sectional elevational view of an embodiment of a novel apparatus for producing coherent radiation.

FIGURE 2 is an enlarged side sectional elevational view of a fragment of the resonant laser cavity shown in FIGURE 1.

FIGURE 3 is a front sectional elevational view of the apparatus of FIGURE 1 viewed along section lines 3—3.

The resonant laser cavity 18 illustrated in FIGURES 1, 2 and 3 is comprised of a cylindrical quartz capillary tube 19 having a central axis 20 and a centrally located capillary or bore 21 along its length. The tube 19 has a middle portion of larger diameter and end portions 22 and 23 with reduced diameters. In this embodiment, the tube 19 is approximately 2½ inches long and 5 mm. in diameter at the middle portion and has about a 1 mm. bore. The reduced end portions 22 and 23 are each about ½ inch long and about 3 mm. in diameter. Precision bore quartz guide tubes 25 and 26 are bonded with a transparent adhesive 24 to end portions and 23 of capillary tube 19, respectively. The guide tubes 25 and 26 are about 1¼ inches long. Precision diameter quartz rods 27 and 28 fit in the guide tubes 25 and 26, respectively, as pistons fit in piston cylinders. The rods 27 and 28 are about 1 inch long and their respective ends 29 and 30 which are adjacent to the capillary tube 19 are optically ground and polished in a spherical concave shape having a radius of curvature of from two to six inches, preferably about two inches. There are dielectric reflection coatings 31 and 32 on the ends 29 and 30, respectively, thereby constituting a resonant optical structure through the bore 21. The coatings 31 and 32 in this embodiment are both about 99.2 to 99.4 percent reflecting and 0.8 to 0.6 percent transmitting to a radiation of about 6118 A. The bore 21 of the tube 19 is filled with a solution 33 of one of the novel chelates disclosed herein. The solution 33 is prevented from leaking out of the cavity 18 by the piston-like fit of rods 27 and 28 in guide tubes 25 and 26, respectively, and the surface tension of the solution 33 which fills the spaces therebetween. The solution 33 must remain in a liquid or glass state at the operating temperature of the laser appaartus and must be essentially transparent and nonscattering to the pump radiation and to the emitted radiation.

The cavity 18 is mounted in the laser apparatus illustrated in FIGURE 1. The apparatus is comprised of a body 41 having an elliptical reflector 42 on the inner wall thereof as shown also in FIGURE 3. The reflector 42 is highly reflective to radiation between about 2500 A. and 4300 A. which is the band used for pumping the novel chelates. The resonant laser cavity 18 is mounted by means (not shown) so that the central axis 20 essentially coincides with one of the focal axes of the elliptical reflector 42. A cylindrical xenon flash lamp 43 is used as the source of pump energy and is mounted by means (not shown) so that its cylindrical axis 44 essentially coincides with the other of the focal axes of the elliptical reflector 42. With this arrangement, most radiation emitted from the flash lamp 43 is focused on the chelate solution 33 in the capillary 21. A means 45 for cooling the solution 33 is incorporated in the apparatus. One cooling means 45 may include a jacket, such as an unsilvered Dewar, around the cavity 18 with means for passing cold nitrogen vapor therethrough. With such an arrangement both the Dewar tube and the coolant must be substantially transmitting to the radiation in the pump band. The jacket may be made, for example, of quartz or borosilicate glass.

FIGURE 1 includes also a schematic circuit 46 for exciting the flash lamp 43. The circuit includes the flash lamp 43 connected in series with a capacitor 47 and a single pole lamp switch 48. A D.C. power supply 49 in series with a single pole charging switch 40 is connected across the capacitor 47.

In operation, the cavity 18 is filled with the solution 33 and then mounted into position in the body 41. A cooling vapor is then passed through the cooling jacket 45, thereby cooling the solution 33 to the desired operating temperature. Preferably the solution 33 is cooled to about 145° K.–165° K. Then, with the lamp switch 48 opened and the charging switch 50 closed, the D.C. power supply 49 charges the capacitor 47. In one apparatus used in all of the examples herein, the capacitor 47 has a capacity of about 200 μf. and is charged to the desired voltage. After the capacitor 47 is charged, the charging switch 50 is opened and then the lamp switch 48 is closed, thereby discharging the capacitor 47 across the flash lamp 43, thus causing an emission of noncoherent radiation from the flash lamp 43 which is related to the energy discharged from the capacitor 47. Noncoherent radiation in the range of about 2500 A. to 4300 A. is absorbed by the chelate solution 33. The threshold energy is the energy (stored in the capacitor 49) required to be supplied to the flash lamp 43 to initiate lasing. This energy may be different for different resonant laser cavities, different flash lamps, capacitors, or elliptical reflectors; and may vary from day to day using the same equipment. Where the energy supplied to the flash lamp 43 is above the threshold energy, coherent light 51 in a narrow band at about 6118 A. is emitted through the partially transmitting reflectors 31 and 32 and out of the rods 27 and 28, respectively, of the resonant laser cavity 18 in a direction essentially parallel to axis 20.

As a specific example, a $1.135 \times 10^{-2}$ molar solution 33 of 2,2,3,3,4,4,5,5,6,6-$d_{10}$-piperidinium tetrakis(4,4,4-trifluoro-1-($d_5$-phenyl)-1,3-butanediono)Eu (III), where d represents deuterium atoms, the subscript represents the number of deuterium atoms present, tetrakis indicates that four ligand groups are bonded to each Eu (III) and Eu (III) represents trivalent europium, in a solvent consisting of an equivolume mixture of proprionitrile, n-butyronitrile and isobutyronitrile, is located in the apparatus illustrated in FIGURES 1, 2 and 3. The capacitor 47 is charged to a voltage of about 2000 volts, which stores about 4000 joules of energy. When this energy is supplied to the lamp 43, the solution 33 emits coherent radiation at about 6118 A., which is characteristic of trivalent europium. In order to determine the laser threshold energy, the voltage across the capacitor 47 which is then discharged across lamp 43 is reduced in successive steps until lasing is no longer observed. The threshold energy of the above preferred embodiment is about 450 joules.

The embodiment shown in the figures is but one example of the invention and many alternatives are possible. For example, the elliptical reflector 42, although useful in increasing the efficiency of the device, thereby decreasing the threshold energy, is not essential to cause lasing so long so long as enough energy is supplied to the chelate solution 33 from the flash lamp 43 to excite it to coherent emission.

The absolute threshold energy of the chelate solutions was not determined. All data contained herein is normalized based on a comparison between the experimentally determined threshold energy of undeuterated piperidinium tetrakis(4,4,4 - trifluoro-1-phenyl-1,3-butanediono)Eu (III) and the material to be tested. The comparison is made on the same day in the same apparatus and under essentially identical conditions.

Cooling as shown, though advantageous, is not essential, as cooling reduces the threshold energy required and, further, helps prevent overheating of the chelate solution. It should be noted that the temperature dependence of lasing is reduced with the novel deuterated chelate as compared to the undeuterated forms. Further, a filter which will transmit the pump energy but absorb other radiation may be positioned around the flash lamp 43. This filter would reduce the heating of the chelate solution 33 and filter out unwanted radiation emitted from the flash lamp. Such a filter material is Dow Corning #9863 glass.

Although the capillary tube 19 shown here was made of quartz, it can be made of any material that will transmit the pump radiation and will be inert to the chelate solution. For example, a borosilicate glass. Also, the tube 19 which functions as a container for the chelate solution 33 can be of any shape that will allow the structure to be a resonant cavity. It is preferable that the diameter of the capillary 21 be small enough so that absorption of pump energy occurs throughout the solution 33 rather than limited to the surface portion. The diameter of the capillary 21 may be different for different chelates and different solutions, and is optimized empirically.

The end portions 29 and 30 of the rods 27 and 28 may be planar and parallel rather than convex. In another variation, the reflection coatings 31 and 32 can be a metallic coating rather than a dielectric coating. Also, the reflection coatings 31 and 32 may be external mirrors individually mounted so as to provide a resonant structure. One reflection coating may be 100% reflecting to the coherent radiation, while the second is partially transmitting. In this arrangement the coherent radiation is emitted from the apparatus only through the partially transmitting reflection coating.

Although the flash lamp 43 is cylindrical, it may be a helical flash lamp mounted so that the axis through the center of the helix essentially coincides with the central axis 20 of the resonant laser cavity. The flash tube may be other than the xenon type so long as it emits enough energy in the region between 2500 and 4300 A. to excite the chelate beyond its laser threshold.

Device discussion has been largely in terms of the most commonly reported laser design. Other designs have been disclosed in the literature and all such variations are considered to be within the scope of the invention.

The solution 33 is comprised of a novel chelate dissolved in a solvent therefor. The chelate is an octaccordinate compound having the empirical formula $d_a$-$Ad_b$-$L_4$Eu (III) wherein, A is an organic ammonium ion, L is a 4,4,4-trifluoro-1 - aryl - 1,3 - butanediono ligand, and Eu (III) is trivalent europium. In the novel chelates a substantial proportion of the hydrogen atoms normally present are replaced with deuterium atoms. The letter "d" represents such deuterium atoms and the subscript to the "d" represents the number of deuterium atoms present in the radical following the "d."

Deuterium atoms may be substituted for the hydrogen atoms of a cyclic group, otherwise called ring atoms, in any part of the chelate molecule. In many of the novel chelates, deuteration appears in more than one part of the molecule. For example, either the aryl group on the ligand or the organic ammonium ion may be deuterated or both may be deuterated. In general, it is preferred that at least 5 deuterium atoms be present and the more present the better.

Specific examples of the novel chelates described herein are 2,2,3,3,4,4,5,5,6,6-$d_{10}$-piperidinium tetrakis(4,4,4-trifluoro-1-($d_5$-phenyl)-1,3-butanediono)Eu (III), 2,2,3,3,4,4,5,5,6,6-$d_{10}$-piperidinium tetrakis(4,4,4 - trifluoro - 1-phenyl - 1,3 - butanediono)Eu (III), piperidinium tetrakis (4,4,4-trifluoro-1-($d_5$-phenyl)-1,3 - butanediono)Eu (III), and 2,2,3,3,4,4,5,5,6,6-$d_{10}$-piperidinium tetrakis(4,4,4-trifluoro-1-thienyl-1,3-butanediono)Eu (III).

Other deuterated chelates are included in this invention. These generally include those chelates having substituted groups on the meta or para positions of the phenyl radical of the ligand. For example 4,4,4-trifluoro-1-(4-iodophenyl)-1,3-butanediono ligand and 4,4,4-trifluoro-1-(4-trifluoro methyl-phenyl)-1,3-butanediono ligand. In other variations other organic ammonium ions may be substituted for piperidinium. This group includes any organic ammonium ion which: (1) is essentially transmitting to the pump radiation of 2500 A. to 4300 A. and to the laser emission wavelength of 6118 A. and (2) has a $pK_H$ high enough so that the ligand is not essentially in competition with it for the hydrogen ion so as to prevent the formation of the tris rather than the tetrakis chelate, and (3) has energy states that do not essentially compete with the triplet state of the ligand as this would reduce quantum yield. Examples of such organic ammonium ions are imidazolium, trimethyl pyridinium, and tetrapropyl ammonium.

The solvent for the chelate should not substantially dissociate the chelate. The solvent should be essentially transparent and nonscattering to the pump band and to the wavelength of coherent emission. Also, the solvent should not have an energy state that would interfere with the transfer of energy from the ligand to the luminescent cation. Examples of usable solvents other than the preferred equivolume mixture of propionitrile, n butyronitrile and isobutyronitrile is a 2:1:1 by volume mixture of β-ethoxypropionitrile, acetonitrile and β-ethoxyethanol or pure acetonitrile or other liquids containing a preponderance of nitrile groups. Any liquid mixture that may be used in laser devices with the undeuterated analogs of the novel chelates disclosed herein may be employed herein.

The solution 33 is preferably between about $5 \times 10^{-3}$ and $2 \times 10^{-2}$ molar. Where higher concentrations are used, the optical density of the solution is increased such that the pump energy is absorbed closer to the surface of the solution. This then requires smaller capillaries 21 to achieve uniform excitation of the solution volume. Generally, the laser mode develops in a small volume along the center of the cavity since losses are much higher in the peripheral portion of a laser cavity. Hence, by only exciting ions in this peripheral portion lasing is inhibited. Where concentrations lower than about $5 \times 10^{-3}$ molar are used the low concentration of europium ions also prevents lasing. In an ideal laser cavity, that is, one with zero losses, there is a theoretical minimum concentration of laser cations necessary to produce laser emission. When this theoretical minimum is corrected for the loss factor of a nonideal cavity, the actual minimum concentrations of such cations can be determined. It has been found empirically that this figure is approximately $5 \times 10^{-3}$ molar in our cavities.

The effect of deuteration on the laser threshold energy of these compounds could not have been expected based on spectroscopic data. The table shows the quantum efficiency, lifetime and threshold energy of several deuterated and undeuterated octacoordinate chelates of europium.

TABLE

| Compound [1] | Relative threshold [2] (168° K.) | Lifetime (msec.) (145° K.) | Relative quantum yield [2] (298° K.) | Solvent [3] |
|---|---|---|---|---|
| Pip(TFPBD)$_4$ Eu (III) | 1.00 | 0.62 | 1.00 | 1 |
| $d_{10}$-Pip(TFBPD)$_4$Eu (III) | 0.64 | 0.63 | 0.96 | 1 |
| Pip($d_5$-TFPBD)$_4$Eu (III) | 0.59 | 0.65 | 1.10 | 1 |
| $d_{10}$-Pip($d_5$-TFPBD)$_4$Eu (III) | 0.47 | 0.63 | 1.12 | 1 |
| Me$_3$P(TFPBD)$_4$Eu (III) | 1.00 | 0.70 | | 1 |
| Pr$_4$N(TFPBD)$_4$Eu (III) | 1.62 | 0.74 | | 1 |
| Im(TFPBD)$_4$Eu (III) | 1.09 | 0.73 | 1.05 | 1 |
| Me$_3$P(4-I-TFPBD)$_4$Eu (III) | 2.53 | 0.70 | | 1 |
| Me$_3$P(4-CF$_3$TFPBD)$_4$Eu (III) | 3.14 | 0.70 | | 1 |
| Me$_3$P(4-F-TFPBD)$_4$Eu (III) | 1.51 | 0.74 | | 1 |
| Pip(3,4-Cl$_2$-TFPBD)$_4$Eu (III) | 3.31 | 0.75 | | 1 |
| Pip(TFTBD)$_4$Eu (III) | 1.62 | 0.73 | 1.16 | 1 |
| Me$_3$P(TFTBD)$_4$Eu (III) | 2.25 | 0.71 | | 1 |
| $d_{10}$-Pip(TFTBD)$_4$Eu (III) | 0.99 | 0.70 | 1.11 | 1 |
| Pip(PBD)$_4$Eu (III) | 1.11 | 0.51 | | 2 |
| $d_{10}$-Pip(PBD)$_4$Eu (III) | 1.02 | 0.49 | | 2 |
| Pip(PBD)$_4$Eu (III) | 2.67 | 0.56 | | 3 |

[1] (a) TFPBD=4,4,4-trifluoro-1-phenyl-1,3-butanediono ligand; (b) TFTBD=4,4,4-trifluoro-1-thienyl-1,3-butanediono ligand; (c) PBD=1-phenylbutanediono ligand; (d) pip=piperidinium ion; (e) Me$_3$P=2,4,6-trimethyl pyridinium (f) Im=Imidazolium ion; (g) Pr$_4$N=tertapropyl ammonium ion; (h) 4-I,4-CF$_3$,4-F,3,4,-Cl$_2$-TFPBD=TFPBD with Iodo, trifluoromethyl, fluoro and dichloro substitution respectively; (i) $d_5$α$d_{10}$=deuterium present on the phenyl groups and piperidinium respectively.
[2] Relative threshold and relative quantum yield are normalized to pip(TFPBD)$_4$Eu (III)=1.00.
[3] Solvent 1=a 2:1:1 by volume ratio of β-ethoxypropionitrile:acetonitrile:β-ethoxyethanol; solvent 2=a 3:1 by volume ratio of ethanol:methanol; solvent 3=a 3:1 by volume ratio of C$_2$D$_5$OH:CD$_3$OH.

Lifetime refers to the average time the excited europium ion remains in the metastable state before decaying to its terminal state via spontaneous emission. The longer this lifetime, the greater is the probability that the excited ion will be stricken by a photon of the proper wavelength to cause stimulated emission in phase with this photon, which process is important in producing coherent emission. In this case, the photon has a wavelength of about 6118 A. characteristic of the trivalent europium cations.

Quantum yield is a measure of the ability of the molecule to transfer the energy absorbed by it into radiant emission from the luminescent cation.

Generally a material with a longer lifetime and a higher quantum yield requires a lower threshold energy for lasing, and a figure of merit that may be used is the product of these values.

Relative values of quantum yield and threshold energy are given ii the table. This data is obtained by normalizing experimental values of quantum yield and threshold energy of the material to be tested against the respective quantum yield and threshold energy of a standard. The standard used is undeuterated piperidinium tetrakis(4,4,4-trifluoro - 1-phenyl-1,3-butanediono)Eu (III). The normalized values are calculated against the standard which is measured the same day, in the same apparatus, and under essentially identical conditions as the compound with which it is to be compared. This procedure is necessary in order to obtain more accurate relative values, because variations in absolute values of threshold energy may be observed if measurements are made at different time or under different conditions.

The table shows that the difference in lifetimes between undeuterated pip(TFPBD)$_4$Eu (III) and the various deuterated analogs shown are only in the order of 1.5 to 3%. Similarly, the relative quantum yields for two of these analogs are only 12% greater than that of the undeuterated chelate. Moreover, the $d_{10}$-pip(TFPBD)$_4$Eu (III) chelate has a 4% lower quantum yield than the undeuterated compounds. Based on this data, one could not expect any significant lowering of threshold energy. However, the table also shows that a 36 to 56% reduction of threshold is observed with solutions of this novel deuterated family of chelates. The table illustrates the same type of unexpected reduction of threshold for $d_{10}$-pip(TFTBD)$_4$Eu (III) as compared to its undeuterated analog.

Various other TFPBD and TFTBD tetrakis chelates of trivalent europium having, as their cations, organic ammonium compounds other than piperidinium and having various substituents on the para-position of the phenyl group of the TFPBD molecule are shown with their relative thresholds.

Referring to the table, deuteration of the piperidinium cation in the PBD europium chelate, which is not included in the class of novel chelates, does not significantly lower the threshold energy of this compound. Furthermore, deuteration of the solvent in this system resulted in a marked increase of the laser threshold energy. Hence, a significant lowering of the threshold energy due to deterioration is not achieved with all chelates.

The novel chelates of the invention can be prepared generally by first dissolving a quantity of europium trichloride in isopropyl alcohol. To this solution is added an amount of chelating ligand equivalent to four times the number of moles of europium trichloride used. The solution is then boiled. To this boiling solution is added piperidine in a quantity such that the total number of moles or piperidine is about equal to the number of moles of chelating ligand present. The solution is then cooled and the resulting precipitate collected by filtration, washed, dried and recrystallized. The following are examples of the preparation of some particular chelates.

*Example 1.*—With constant stirring 0.26 gram of europium trichloride and 0.88 gram of 4,4,4-trifluoro-1-($d_5$-phenyl)-1,3-butanedione are dissolved in 10 ml. of isopropyl alcohol. The solution is brought to the boiling point to insure complete dissolution. To this boiling solution is added a previously freshly prepared solution of 0.38 gram of 1,2,2,3,3,4,4,5,5,6,6-$d_{11}$-piperidine in 5 ml. of isopropyl alcohol. The resulting solution is then allowed to cool and is refrigerated overnight. A precipitate of 2,2,3,3,4,4,5,5,6,6 - $d_{10}$-piperidinium tetrakis(4,4,4-trifluoro-1-($d_5$-phenyl)-1,3-butanediono)Eu (III) forms which is collected by filtration. The precipitate is then washed with water and dried in vacuum. The dried precipitate is then recrystallized from 20 ml. of cyclohexane. The yield is about 0.92 gram and the final product has a melting point range of 170–171° C.

*Example 2.*—With constant stirring 0.52 gram of europium trichloride and 1.77 gram of 4,4,5-trifluoro-1-($d_5$-phenyl)-1,3-butanedione are dissolved in 20 ml. of isopropyl alcohol. The solution is brought to the boiling point to insure complete dissolution. To this boiling solution is added 0.68 gram of piperidine. The solution is then allowed to cool and is refrigerated overnight. A precipitate of piperidinium tetrakis(4,4,4-trifluoro-1-($d_5$-phenyl)-1,3-butanediono)Eu (III) forms which is collected by filtration. The precipitate is then washed with water and dried in vacuum. The dried precipitate is then recrystallized from 20 ml. of cyclohexane to give 1.60 grams of the final product. This final product has a melting point range of 168–171° C.

*Example 3.*—With constant stirring 0.26 gram of europium trichloride and 0.865 gram of 4,4,4-trifluoro-1-phenyl-1,3-butanedione are dissolved in 15 ml. of isopropyl alcohol. The solution is brought to the boiling point insure complete dissolution. To this boiling solution is added 0.37 gram of 1,2,2,3,3,4,4,5,5,6,6-$d_{11}$-piperidine. The solution is then allowed to cool and is refrigerated overnight. A precipitate of 2,2,3,3,4,4,5,5,6,6 - $d_{10}$-piperidinium tetrakis-(4,4,4-trifluoro-1-phenyl-1,3-butanedione)Eu (III) forms which is collected by filtration. The precipitate is then washed with water and dried in vacuum. The dried precipitate is then recrystallized from 30 ml. of cyclohexane to give 0.80 gram of product. The final product has a melting point range of 171.5–172.5° C.

The deuterated piperidine used in the above preparations is available from Merck Sharpe & Dohme Ltd. of Canada. The deuterated trifluorophenyl butanedione chelating agent may be prepared by the following method. To a suspension of 2.25 grams of sodium methoxide in 25 ml. of dry ether, under a blanket of dry nitrogen, add over a 10 minute period 6.20 grams of ethyl trifluoroacetate in 20 ml. of dry ether. The resulting solution is heated under reflux, while a solution of 5.00 grams of 2,3,4,5,6-$d_5$-acetophenone is 20 ml. of dry ether is added dropwise over a 15 minute period. The mixture is then heated under reflux for 6 more hours and then concentrated to a thick oil under reduced pressure. The oil is then triturated with 200 ml. of hot hexane. The resulting solid is collected by filtration, washed with hexane and dried in vacuum. The dried solid is dissolved in 75 ml. of water and 50 grams of ice is added. The solution is then acidified with concentrated hydrochloric acid and the resulting white solid, 4,4,4-trifluoro-1-($d_5$-phenyl)-1,3-butanedione is collected by filtration and dried. A yield of about 6.59 g. (75%) is obtained. The product has a melting point range of 38.0–38.5° C.

*Example 4.*—To a boiling solution of 1.43 grams of tris(4,4,4 - trifluoro - 1 - (2 - thienyl) - 1,3 - butanediono) Eu (III) in 20 ml. of isopropyl alcohol, add 0.49 gram of 4,4,4-trifluoro-1-(2-thienyl)-1,3-butanedione and 0.21 gram of 1,2,2,3,3,4,4,5,5,6,6-$d_{11}$-piperidine. The resulting solution is refrigerated overnight. A precipitate of 2,2,3,3,4,4,5,5,6,6-$d_{10}$-piperidinium tetrakis(4,4,4-trifluoro-1-(2-thienyl)-1,3-butanediono)Eu (III) is formed. The precipitate is collected by filtration, washed with isopropyl alcohol, dried in vacuum and finally recrystallized from 20 ml. of isopropyl alcohol to give 1.49 grams of product. The product melts between 164° C. and 165° C.

What is claimed is:

1. A composition of matter consisting essentially of an octacoordinate chelate compound represented by the formula $d_\alpha$-$Ad_\lambda$-$L_4$Eu (III) where
   (a) Eu (III) is trivalent europium,
   (b) L is a 4,4,4-trifluoro-1-aryl-1,3-butanediono ligand wherein the aryl radical is an unsubstituted phenyl group, a phenyl group substituted in the meta or para position, or a thienyl group,
   (c) A is an organic ammonium ion, wherein said ion essentially transmits radiation in the range between 2500 A. and 4300 A. and at about 6118 A. and where its energy states do not compete with the triplet levels of said ligand, and
wherein a substantial proportion of the hydrogen atoms in said compound are replaced by deuterium atoms, said deuterium atom being represented by $d_\alpha$ and $d_\lambda$, the subscripts $\alpha$ and $\lambda$ refer to the number of said deuterium atoms present on the A and L part of the chelate molecule respectively.

2. A composition of matter consisting essentially of an octacoordinate chelate compound represented by the formula $d_\alpha\text{-}Ad_\lambda\text{-}L_4Eu$ (III) where
   (a) Eu (III) is trivalent europium,
   (b) L is a 4,4,4-trifluoro-1-phenyl-1,3-butanediono ligand,
   (c) A is a monovalent cation of either piperidinium, imidazolium, or 2,4,6-trimethylpyridinium, and
wherein a substantial proportion of hydrogen atoms bonded to ring carbon atoms are replaced by deuterium atoms, said deuterium atoms being represented by $d_\alpha$ and $d_\lambda$.

3. A composition of matter consisting essentially of an octacoordinate chelate compound represented by the formula $d_\alpha$-piperidinium $d_\lambda$-(4,4,4-trifluoro-1-phenyl-1,3-butanediono)$_4$Eu (III) where
   (a) Eu (III) is travalent europium, and
   (b) all the hydrogen atoms bonded to the carbon atoms of at least one cyclic group of said compound are replaced by deuterium atoms, said deuterium atoms being represented by $d_\alpha$ and $d_\lambda$, the subscripts $\alpha$ and $\lambda$ referring to the number of deuterium atoms present on the piperidinium ion and phenyl radicals respectively and where $\alpha$ can vary from zero to ten and $\lambda$ can vary from zero to twenty, $\alpha$ plus $\lambda$ being at least five.

4. A composition of matter as described in claim 3 wherein $\alpha$ is zero and $\lambda$ is twenty, whereby all of the hydrogen atoms on the phenyl radicals of said compound are replaced by deuterium atoms.

5. A composition of matter as described in claim 3 wherein $\alpha$ is ten and $\lambda$ is zero whereby all of the hydrogen atoms bonded to the carbon atoms of the piperidinium ion are replaced by deuterium atoms.

6. A composition of matter as described in claim 3 wherein $\alpha$ is ten and $\lambda$ is twenty whereby all of the hydrogen atoms bonded to carbon atoms on both the piperidinium ion and the phenyl radicals are replaced by deuterium atoms.

7. A composition of matter consisting essentially of an octacoordinate chelate compound represented by the formula $d_\alpha$-piperidinium $d_\lambda$-(4,4,4-trifluoro-1-thienyl-1,3-butanediono)$_4$Eu (III) where
   (a) Eu (III) is trivalent europium,
   (b) all hydrogen atoms bonded to carbon atoms of at least one cyclic group of said compound are replaced by deuterium atoms, said deuterium atoms being represented by $d_\alpha$ and $d_\lambda$, the subscripts $\alpha$ and $\lambda$ representing the number of deuterium atoms present.

8. A composition of matter as described in claim 7 wherein $\alpha$ is ten and $\lambda$ is zero, whereby all of the hydrogen atoms bonded to carbon atoms on the piperidinium cation are replaced by deuterium.

9. An apparatus for producing coherent radiation by stimulated emission comprising,
   (a) a resonant cavity for coherent light, said cavity containing a solution of at least one of the compounds described in claim 1, said compound being present in said solution in the range of about $5 \times 10^{-3}$ molar to $2 \times 10^{-2}$ molar, said solution being essentially transparent and nonscattering to the coherent radiation,
   (b) means for exciting said compound to lasing action, and
   (c) means for deriving said coherent radiation from said cavity.

10. An apparatus for producing coherent radiation by stimulated emission comprising,
    (a) a resonant cavity for coherent light, said cavity containing a solution of at least one of the octacoordinate chelate compounds described in claim 3, said compound being present in said solution in the range of about $5 \times 10^{-3}$ molar to $2 \times 10^{-2}$ molar, and said solution being essentially transparent and nonscattering to light,
    (b) means for exciting said compound to lasing action, and
    (c) means for deriving said coherent radiation from said cavity.

11. An apparatus for producing coherent radiation by stimulated emission as described in claim 10 wherein said chelate compound is piperidinium tetrakis(4,4,4-trifluoro-1-($d_5$-phenyl)-1,3-butanediono)Eu (III), wherein all of the hydrogen atoms on the phenyl radicals of said chelate have been replaced by deuterium atoms.

12. An apparatus for producing coherent radiation by stimulated emission as described in claim 10 wherein said chelate compound is $d_{10}$-piperidinium tetrakis(4,4,4-trifluoro-1-phenyl-1,3-butanediono)Eu (III), wherein all of the hydrogen atoms bonded to the carbon atoms of the piperidinium ion of said chelate are replaced by deuterium atoms.

13. An apparatus for producing coherent radiation by stimulated emission as described in claim 10 wherein said chelate compound is $d_{10}$-piperidinium tetrakis(4,4,4-trifluoro-1-($d_5$-phenyl)-1,3-butanediono)Eu (III) wherein all hydrogen atoms bonded to the carbon atoms on both the piperidinium ion and the phenyl radicals of said chelate have been replaced by deuterium atoms.

14. An apparatus for producing coherent radiation by stimulated emission comprising,
    (a) a cavity resonant to light of about 6118 A. having reflecting ends, at least one of which partially transmitting to light of said wavelength, the wall of said cavity being essentially transmitting to light of between 2500 and 4300 A., said cavity being filled with a solution of $d_{10}$-piperidinium tetrakis(4,4,4-trifluoro-1-($d_5$-phenyl)-1,3-butanediono)Eu (III) chelate wherein all hyrdogen atoms bonded to the carbon atoms on both the piperidinium ion and the phenyl radicals of said chelate have been replaced by deuterium atoms, said solution being essentially transparent and nonscattering to light of about 6118 A.,
    (b) means for exciting said chelate to lasing action wherein said means emits radiation between 2500 and 4300 A.,
    (c) means for cooling said solution, said cooling means being essentially transparent to the exciting radiation.

15. An apparatus for producing coherent radiation by stimulated emission comprising,
    (a) a resonant cavity for coherent light, said cavity containing a solution of at least one of the octacoordinate chelate compounds described in claim 7, said compound being present in said solution in the range of about $5 \times 10^{-3}$ molar to $2 \times 10^{-2}$ molar, and said solution being essentially transparent and nonscattering to light,
    (b) means for exciting said compound to lasing action, and
    (c) means for deriving said coherent radiation from said cavity.

16. An apparatus for producing coherent radiation by stimulated emission as described in claim 15 wherein said chelate compound is $d_{10}$-piperidinium tetrakis(4,4,4-trifluoro-1-thienyl-1,3-butanediono)Eu (III) wherein all of the hydrogen atoms bonded to the carbon atoms of the piperidinium ion have been replaced by deuterium.

References Cited

UNITED STATES PATENTS

| | | | |
|---|---|---|---|
| 3,223,944 | 12/1965 | Luck et al. | 331—94.5 |
| 3,225,307 | 12/1965 | Weissman | 331—94.5 |
| 3,360,478 | 12/1967 | Schimitschek et al. | 252—301.2 |

RONALD L. WIBERT, *Primary Examiner.*

CONRAD CLARK, *Assistant Examiner.*

U.S. Cl. X.R.

252—301.2